Oct. 26, 1965 G. W. BOOTH 3,214,740

MEMORY DEVICE AND METHOD OF MAKING SAME

Filed Jan. 16, 1959 2 Sheets-Sheet 1

INVENTOR.
GRANT W. BOOTH

BY Jacob Trachtman

ATTORNEY.

Oct. 26, 1965 G. W. BOOTH 3,214,740

MEMORY DEVICE AND METHOD OF MAKING SAME

Filed Jan. 16, 1959 2 Sheets-Sheet 2

INVENTOR.
GRANT W. BOOTH
BY
Jacob Trachtman
ATTORNEY.

United States Patent Office 3,214,740

Patented Oct. 26, 1965

3,214,740
MEMORY DEVICE AND METHOD OF MAKING SAME

Grant W. Booth, Collingswood, N.J., assignor to Rese Engineering, Inc., Philadelphia, Pa., a corporation of Pennsylvania Filed Jan. 16, 1959, Ser. No. 787,183
4 Claims. (Cl. 340—174)

Figures 1, 2, 3, 4:
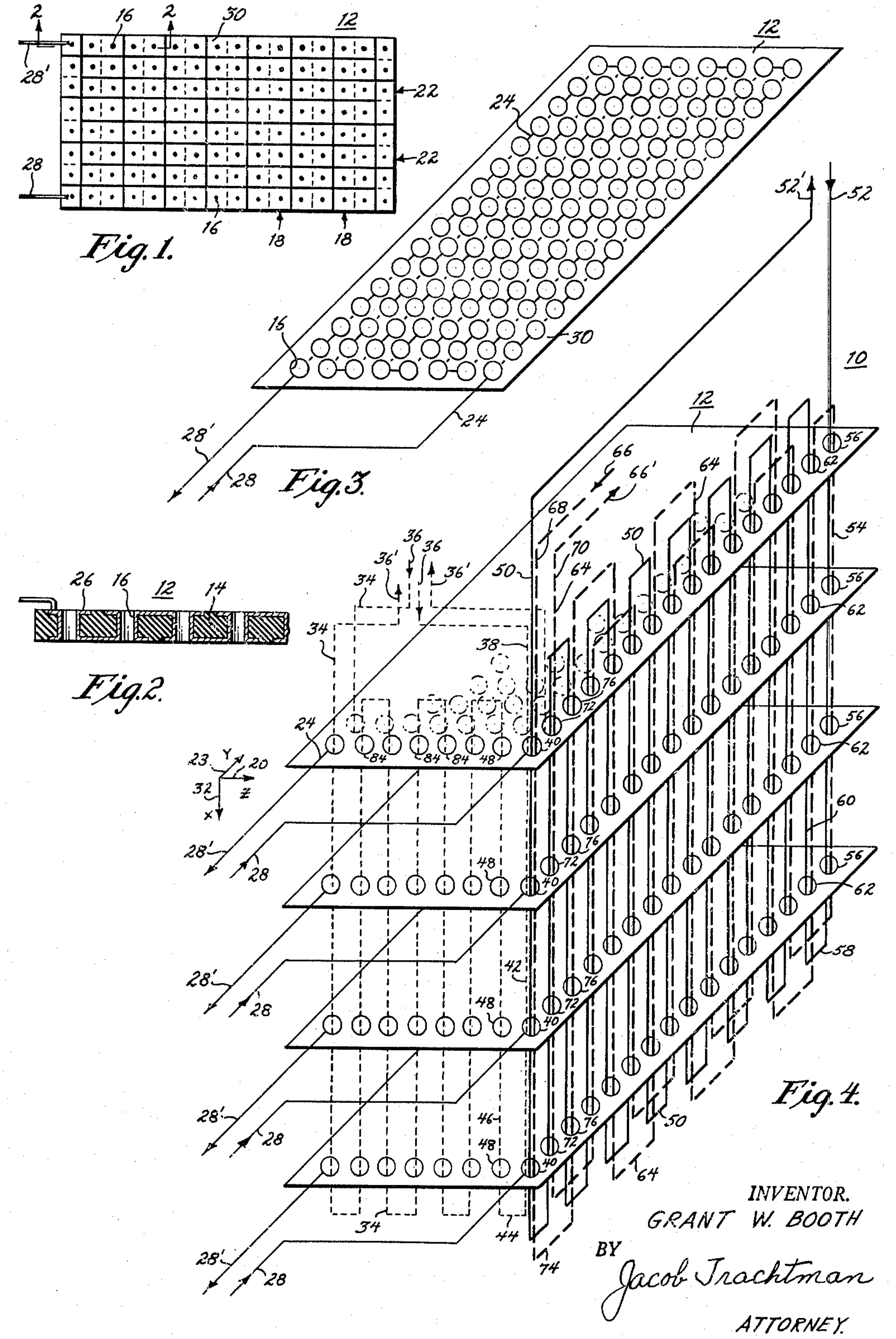

This invention relates to memory devices and method of making same, and more particularly to magnetic memory devices for storing information in binary form.

Heretofore, memory devices have been made utilizing a plurality of magnetic memory elements. Such devices have been provided with access windings, digit windings and sense windings which are difficult to thread through the memory elements. Such windings also resulted in a high level of noise on the sense winding or required an increased number of magnetic storage elements to achieve noise cancellation. Such prior art devices, therefore, have been difficult to manufacture, expensive in cost, inefficient in operation and less compact than desired.

It is therefore a primary object of the invention to provide a new and improved memory device and method for efficiently and economically producing memory devices of any capacity by an improved structure and method of manufacturing magnetic memory devices.

Another object of the invention is to provide a new and improved memory device and method of making same by more efficiently threading the windings of the device.

Another object of the invention is to provide a new and improved memory device and method utilizing aligned apertured plate units for threading a plurality of windings along predetermined linear paths of the device.

Another object of the invention is to provide a new and improved memory device and method of making same adaptable to mass production techniques.

Another object of the invention is to provide a new and improved memory device and method providing efficient noise cancellation on the sense windings.

Another object of the invention is to provide a new and improved memory device and method utilizing printed circuitry to provide a winding through the magnetic memory elements of a memory plate unit, and utilizing standardized magnetic memory plate units.

Another object of the invention is to provide a new and improved memory device and method providing maximum utilization of memory elements and minimizing the space requirements while still providing cancellation of noise on the sense windings.

Another object of the invention is to provide a new and improved memory device and method of making same which is readily adaptable for providing different word size storage and word storage capacity as required by the particular design conditions.

Another object of the invention is to provide a new and improved memory device which can be used with standard driving and sensing equipment.

Another object of the invention is to provide a new and improved memory device utilizing conventional coincident current techniques.

Another object of the invention is to provide a new and improved memory device which can be designed for different load requirements of the access and digit windings.

Another object of the invention is to provide a memory device which is highly flexible with respect to the dimensions of the magnetic memory plate units and the interconnection of a plurality of such devices.

Another object of the invention is to provide a new and improved memory device and method which is inexpensive to manufacture, highly reliable, compact, and efficient in operation. The above advantages are achieved by providing a memory device comprising a plurality of apertured memory plate units each having a plate X access winding threaded through each of its respective apertures. The apertures each provide a memory location in the plate unit, and are arranged in columns and rows with corresponding apertures of the several plates in alignment. A plurality of Y access windings are provided each linearly extending through a set of aligned apertures of said plate units of a respective row of apertures, with their adjacent linear conducting paths having opposite senses. A plurality of digit windings are similarly provided, each of which passes through aligned apertures of a respective column of apertures of said device. Each of the digit windings provides adjacent linear conducting paths with opposite senses. A plurality of sense windings are strung along linear paths through aligned apertures of said plate units of respective columns of apertures of the plate units. The sense windings have conducting paths in the same sense as its associated X and Y access winding along certain predetermined paths and in the opposite sense along other predetermined paths to reduce the production of noise signals. The sense windings may also be provided with interconnections so that a portion of the linear path through an aligned set of apertures is directed in one sense, while the other portion of said path is directed in the opposite sense to cancel noise signals produced by the memory device.

The process of the invention is the method of making a memory device of a plurality of aligned apertured memory units with each unit having a plated conducting path providing an X access winding through each of its apertures which comprises threading each Y access winding of a plurality of such windings along linear paths through aligned apertures of a respective row of the units with adjacent paths of each of the windings being threaded in opposite directions through the apertures.

Digit windings are provided by being strung along paths with corresponding Y access windings by threading each digit winding along linear paths through aligned apertures of a respective column of the units with adjacent paths of each of the digit windings being threaded in opposite directions through said apertures and the directions of the paths through the apertures being alternated to minimize noise signals.

The method of the invention includes the provision of sense windings strung along first and second portions of linear paths with corresponding X and Y access windings by threading each sense winding along first and second linear paths through aligned apertures through a respective column of the units with the direction of adjacent parallel paths through the apertures alternated and the conducting sense of the first portion of the path being opposite to that of the second portion of the path to minimize noise signals.

Figures 5, 6:
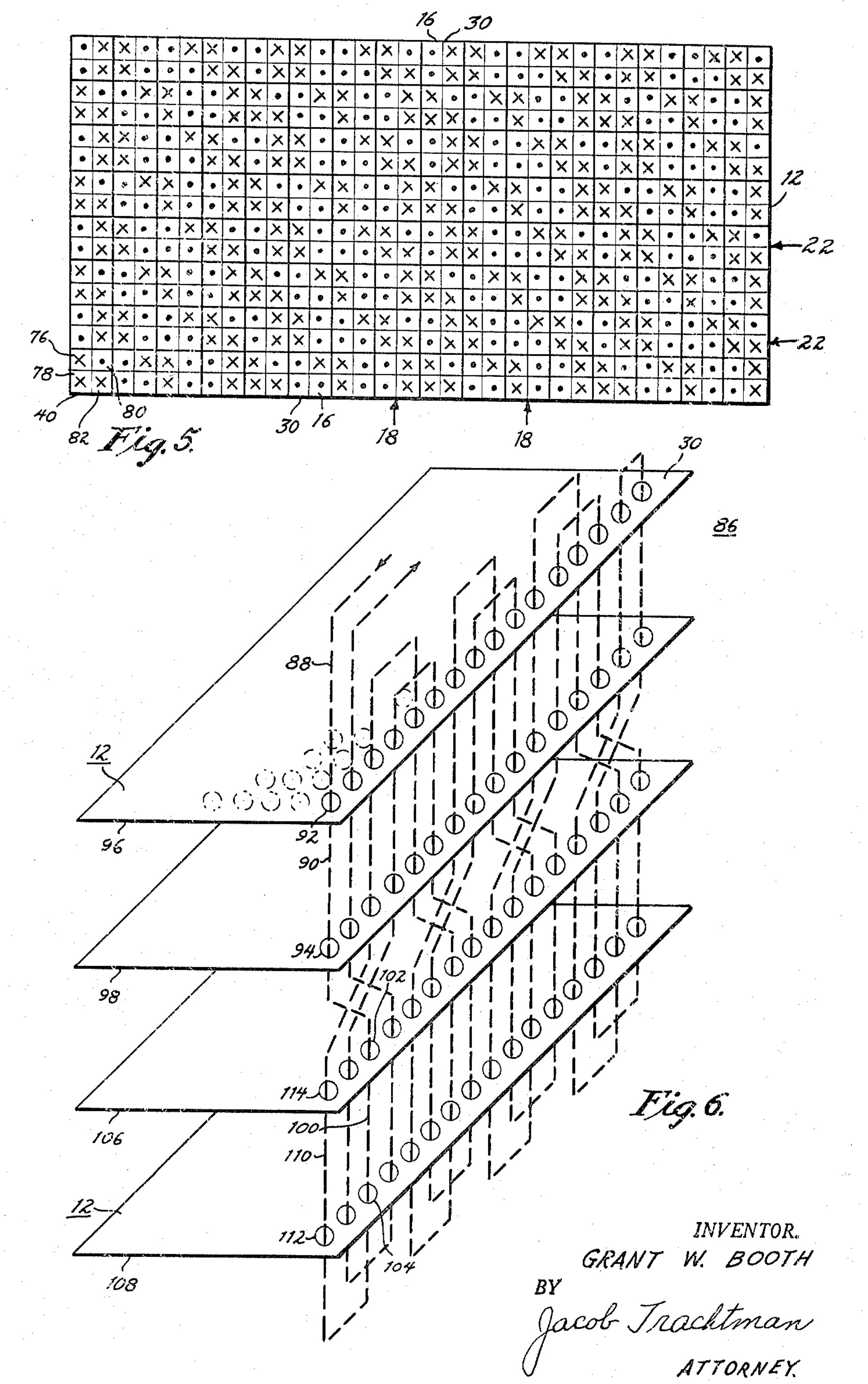

The foregoing and other objects of the invention will become more apparent as the following detailed description is read in conjunction with the drawings, in which:

FIGURE 1 is a plane view of a magnetic memory plate unit,

FIGURE 2 is an enlarged sectional view of a fragment taken on the line 2—2 of FIGURE 1, FIGURE 3 is a diagrammatic view of the plate unit shown in FIGURE 2, illustrating the form of the X access winding, FIGURE 4 is a schematic view of a memory device embodying the invention, FIGURE 5 schematicaly illustrates the senses of the windings through the apertures of the uppermost plate unit of FIGURE 4, and FIGURE 6 schematically illustrates a modified form of the memory device shown in FIGURE 4.

Like reference numerals designate like parts throughout the several views.

Referring to the figures, a memory device 10 embodying the invention shown in schematic form in FIGURE 4 is comprised of a plurality of stacked or aligned apertured magnetic memory plate units 12 (see FIGURES 1 and 2). The apertured plates 12 may be similar to those described in the article entitled "Ferrite Apertured Plate for Random Access Memory," by Jan A. Rajchman, in the "Proceedings of the Institute of Radio Engineers," March 1957, pages 325 to 334. By using such plates 12, it is noted that memory elements 30 are formed by the peripheral ferrite regions bordering the apertures 16. The plate units 12 are made of a ferrite material 14 having the square loop properties required for coincident current excitation such as the properties of the material of the ferrite toroids described in Patent No. 2,736,880.

As illustrated in FIGURE 1, the unit 12 is provided with a plurality of apertures 16 arranged in sixteen rows 18 directed parallel to the Z axis 20 (see FIGURE 4), and eight columns 22 parallel to the Y axis 23.

The use of such plate units 12 allows an X access winding 24 to be provided by a plating operation. This is seen in FIGURE 2, where the metal plating 26 provides a current path passing alternately downward and upward through adjacent apertures 16 of the columns 22 of the plate 12. The plate winding 24 passes down one column 22 and up the next adjacent column 22, thereby weaving a series path back and forth between the ends of the unit 12 to connect the output leads 28, 28′ of the X access winding 24.

Each of the plurality of plates 12 is provided with such an X access winding 24. The use of such a plated winding eliminates the need for individually threading the X access winding for each of the plate units 12. It is noted however, that the invention may be carried out without the use of such plate units 12 by providing memory or core elements equivalent to the memory elements 30 formed about each of the apertures 16 of the plate unit 12.

A plurality of plate units 12 are positioned or stacked with respective ones of their apertures 16 aligned and positioned along the X axis 32 of the X, Y, Z Cartesian coordinate system. For purposes of illustration, four such plate units 12 are diagrammatically shown in FIGURE 4. However, the memory device 10 may have any number of such plate units with each plate unit 12 having any required number of apertures arranged in columns and rows of any predetermined numbers to meet various design requirements.

The plurality of Y access windings 34 are provided, some of which are shown in FIGURE 4, others omitted for purposes of clarity. Each Y access winding 34 corresponding to a row 18 of apertures 16 and is formed by threading a conducting wire along linear paths parallel to the X axis 32 through the aligned openings 16 along a respective row of the plate unit 12. Each Y access winding 34 is connected to a pair of leads 36, 36′ by a plurality of parallel conducting paths which alternate from one path to the next. For example, if the lead 36 of the first row Y access winding 38 is taken to have a downward sense through the set of vertically aligned openings 40 of the plate unit 12, at the end of the first linear path 42 the winding 38 is provided with a loop 44, and then passes in the upward direction along a linear path 46. This provides an upward sense through the set of openings 48 adjacent and parallel to the set of aligned openings 40 of the first row. The winding 38 thus passes down one set of openings 40 and up the next adjacent set of openings 48 and so on, so that the senses of the current direction vary or alternate from one adjacent path to the next along the row 18 of openings 16 from one to the other of the leads 36, 36′.

Furthermore, it is noted that the senses of the pairs of input leads 36, 36′ alternate from winding to winding, so that if the right input lead 36 of the first row is in the downward sense, the adjacent right input lead 36′ of the second row has the opposite or upward sense. With this arrangement, the sense or direction of current flow of the X windings of the plate units 12 and the Y access windings 34 are always in the same direction through the some openings 16. This is required in order to obtain coincident current excitation of selected memory elements 30 of the device 10.

In a similar manner, the plurality of digit windings 50 each joined to a pair of leads 52, 52′ provide a respective winding 50 for each column 22 of the device 10. Again, only some of the windings are shown in FIGURE 4 with others omitted for the purpose of clarity. Tracing the path of the winding 50 of the first column 22 shown by FIGURE 4, the lead 52 is connected to a conductor threaded through and providing a linear path 54 along the aligned apertures 56 of the several plate units 12. The digit winding 50 has a loop 58 at the end of its linear path and proceeds in the upward direction along a linear path 60 through the adjacent aligned openings 62. Thus, the sense of the winding 50 alternates between adjacent aligned openings 16 or linear paths as the winding 50 is threaded along its column 22. In this connection, it is noted, that the sense of the linear paths of the digit winding 50 is opposite to that of the X access windings 24 and the Y access windings 34. This means that the current path or sense of flow through each opening 16 of the digit winding 50 of the memory device 10 is opposite to the sense or direction of the current flowing in the X and Y access windings 24, 34. To achieve this result the senses of corresponding associated leads 52, 52′ of windings 50 also alternates in sense from one winding 50 to the next adjacent winding 50. Although such additional windings are not shown in FIGURE 4 for purposes of clarity, their senses are amply illustrated in connection with FIGURE 5 which will be described in detail below.

A sense winding 64 is respectively provided for each of the columns 22 of the plate units 12. The first and second leads 66 and 66′ of the winding 64 of the first column as shown in FIGURE 4 are respectively connected to conductors 68, 70. The conductors 68, 70 extend along respective linear paths through aligned openings 40 and 72. The conductor 68 which extends through the opening 40 is looped at 74, skips the adjacent set of openings 72, and is strung upwardly through the next set of aligned openings 76. The winding 64 is generally continued by threading up and down aligned openings 16 with the skipping of intermediate aligned openings 16. In this manner, the winding 64 continues until it passes up through the aligned openings 62 and down through the last aligned openings 56 of the column 22, after which its path is continued by skipping the aligned openings 62 and alternate openings thereafter, until it passes upwardly through the aligned openings 72 of the units 12 and connects with the lead 66′. By this scheme of threading or stringing, the sense winding 64 passes in the same sense with the X and Y access windings 24, 34 along certain linear paths, such as those through the aligned openings 40, and also alternately provides equal paths in the opposite sense to the access windings 24, 34, as through the openings 62. This winding arrangement gives noise cancellation on the sense winding 64 due to the energization of an X access winding. It is noted that although each of the sense windings 64 have respective columns identical to the other sense windings 64, such similarity is not essential for the purpose just described.

Even though all of the windings 24, 34, 50 and 64 are not shown in FIGURE 4, all of the senses of the windings as they pass through the uppermost plate unit 12, are diagrammatically illustrated in FIGURE 5. From the scheme of threading the windings just described, the senses of those windings which pass through the aligned openings of the associated plate units 12 are readily discerned from FIGURE 5.

The schematic illustration of the plate unit 12 of FIGURE 5, is divided into sixteen rows 18 and eight columns 22 of apertures 16 to correspond to the plate unit shown in FIGURE 1. Each of the memory elements 30 surrounding an aperture 16 is represented by a dark square block of FIGURE 5. Each dark square block 16 is divided into four segments 76, 78, 80 and 82. The upper left segment 76 relates to the X access winding 24, the lower left segment 78 indicates the Y access winding 34, the upper right segment 80 refers to the digit winding 50, while the lower right segment 82 is used to represent the sense winding 64. A cross "X" within a segment designates a downward sense of the winding, or current flow into the plane of the drawing through its particular aperture 16, while a dot "." represents an upward sense of the winding, or current flow out of the plane of the drawing. Thus, for example, for the opening 40 of the uppermost plate unit 12, the FIGURE 5 designates that the senses of the X access winding 25, the Y access winding 34, and the sense winding 64 are in the same direction downward through the opening, while the sense of the digit winding 50 is upward and opposite to its associated windings through the aperture 40. Similarly, all of the other blocks represent corresponding apertures 16 and show the senses of each of the windings passing therethrough.

In operation of the memory device 10, binary information is stored in selected locations by the principle of concurrent energization of the X and Y access windings 24 and 34. Information may be recorded simultaneously in all of the locations of a row of memory elements 30 of a selected plate unit 12, by energizing the leads 28, 28′ of the selected X access winding 24 and concurrently energizing the leads 36, 36′ of the selected Y access winding 34. The presence of concurrent signals excites each memory location 30 so that it is placed in one of its binary states such as the "one" state. Any location which is to remain in its original "zero" state, has the leads 52, 52′ of its digit winding energized. Since the current of the digit winding 50 opposes that of the X and Y access windings 24, 34, the resultant total effective current through the opening 16 is insufficient to energize such memory location or element 30 to its "one" state. Such inhibited locations are thus maintained in their original "zero" state. It should be noted here that all of the locations are cleared to zero condition prior to the writing or recording operation by a preceding reading operation. In this manner, all of the rows may have recorded such information which is to be stored, with recording taking place in any desired order. This information may be stored by taking each of the rows of one plate 12 successively, or in any other series or program with selected rows and plates.

With information in the memory locations or elements 30, such stored information of any selected row and plate may be read out and sensed by the sense windings 64.

The sense operation usually precedes the write or recording operation, especially when the information read is to be regenerated and replaced in the same or other memory locations. To provide a sense signal determining the information stored in a particular location, the required X and Y access windings 24, 34 of this memory location or address are concurrently energized, while no signals are delivered to the digit windings 50. For reading, however, the currents delivered to the X and Y access windings 24, 34 both have the opposite sense from the writing currents so that the memory locations which are in the "one" states are switched to the "zero" states. The locations which were in their "zero" state, of course, remain in this state. Those memory locations which are switched from their "one" state to their "zero" state provide a signal, in the manner well-known to the art, which is detected by respective sense windings 64 corresponding to their column positions. The device 10 thereby provides parallel read output signals on its sense windings 64 representing the binary information stored in the selected row of memory elements 30.

If the material read out is to be replaced in the same memory locations, after the read operation, concurrent write signals are delivered to the X and Y access windings 24, 34, while the respective digit windings 50 are energized for those column locations which are to be maintained in their "zero" conditions. This process of reading, writing and regenerating signals can be repeatedly carried out in the manner stated above in accordance with any desired sequence or program.

The memory device 10 by providing a digit winding 50 and a separate sense winding 64 makes unnecessary the switching of sensing and writing devices, as is necessary when only one such winding is used for sensing and writing. The provision of the separate sensing winding 64 and the manner of its winding, also provides important noise cancelling properties, which will now be described.

Noise signals may be generated on the sense winding 64 by the transient responses occurring with the application of exciting currents to the various X and Y access windings 24, 34. If such noise signals are additive, they seriously interfere with the information signal which is to be sensed by the sense winding 64. In order to minimize such noise signals, the sense winding 64 is designed to provide cancellation of noise, thereby materially reducing its level with respect to the sense signals produced.

When, for example, the uppermost plate unit 12 has its X access winding 24 excited, while the Y access winding 34 corresponding to the first row is energized, the concurrent currents through the openings 84 of the first row of plate unit 12 excites their corresponding memory elements 30. Thus, the signals produced at these locations contain the desired information, while all other signals incidentally generated at other locations are noise signals which are undesirable. Since the sense winding 64 is wound so that it alternates its sense with respect to the X access winding 24 within the plate unit 12 all the noise signals generated along each of the columns of the uppermost plate unit 12 are automatically cancelled. This effect holds for each of the plate units 12 which is energized. However, since a signal is generated by the presence of a "one" condition at a memory location 30 receiving concurrent X and Y access winding excitation, such signal which has a greater magnitude than any one of the noise signals, predominates and its presence is readily detected. The memory device 10 provides parallel read out to each of the sense windings 64 which are similarly affected to operate in an identical manner to produce cancellation of noise signals and allowing the ready detection of the sensed signal.

The memory device 10 shown in FIGURE 4, thus, provides a structure which is highly efficient in memory element utilization and accuracy, while allowing the device to be easily and inexpensively fabricated. The device 10 may be made in accordance with the method described herein by threading the windings along linear paths through aligned apertures of the device, thereby materially reducing the difficulty of production of high capacity memory units of miniature size. The arrangement of the units 12 and windings provide for the positioning of words, having digits which are simultaneously read on a single plate. Thus by designing the size and the number of storage elements per row, the device 10 is readily adaptable for the particular design requirements of a memory system. It is also readily evident that a plurality of devices, such devices 10 may be connected together to form composite memory systems. Such arrangements allow control of the driving loads for the various windings since corresponding X and Y access windings may be connected in series or parallel, for driving by a single source, or for being driven separately by several sources. This also makes it adaptable for various size storage capacities and word sizes. Interconnections of the sense windings of several devices 10 can also be made for noise cancellation due to energization of the X access winding as well as that due to energization of the Y access winding as will become apparent from the modified form of device shown in FIGURE 6.

The FIGURE 6 discloses a modified form of memory device 86 in which the sense windings 88 are provided for cancelling noise generated along a linear path through aligned apertures of the plate units 12 due to energization of a Y access winding 34. Tracing the path of the sense winding 88, it comprises a linear portion 90 passing through the openings 92, 94 in the downward sense for the first two upper plate units 96, 98 and then passes in the same sense along the linear portion 100 through the openings 102, 104 of the lower plate units 106, 108. The winding then passes in the upward sense along linear path portion 110 through the openings 112, 114 of the plate units 108, 106. Thus, the total linear path through the aligned openings 92, 94, 114 and 112 is provided with two linear conducting portions 90, 110 passing through the same number of memory elements 30 but in the opposite sense to each other. This is true for all of the other composite linear paths through the aligned openings of the plate units 12. The paths of the sense winding 88 illustrated in connection with the device 86 may be achieved by providing the interconnections of various upper and lower portions of paths such as the portions 90 and 100 through different aligned apertures by a single threading operation as stated, or may be achieved by winding the upper plates 96, 98 separately from the lower plate units 106, 108 and then appropriately interconnecting the conductors to provide the paths illustrated.

The windings 24, 34 and 50 not shown in FIGURE 6 of the device 86 may be identical to those shown in connection with the device 10 of FIGURE 4. Alternately the device 86 may be provided with a set of separately strung windings 24, 34 and 50 which may be connected together in parallel or series to provide a similar structure embodying the invention.

An advantage achieved by the device 86 over the device 10 is that in addition to the cancellation achieved within each plate along the columns 22 or in the direction of the Y axis due to energization of the X access windings 24, cancellation of noise signals is also achieved along the linear paths through aligned apertures 16 or in the direction of the X axis 32 due to the energization of the Y access windings 34. Thus, a highly sensitive and efficient memory device is achieved which does not require duplication of memory elements to provide highly effective cancellation of noise signals.

It will be obvious to those skilled in the art that the invention may find wide application with appropriate modification to meet the individual design circumstances, but without substantial departure from the essence of the invention.

What is claimed is:

1. A memory device comprising a plurality of units each being a substantially plane plate of magnetizable material having high magnetic remanence relative to saturation and having apertures at predetermined memory locations providing respective magnetic storage elements positioned along first and second coordinates with said plate units being positioned at several predetermined locations along a third coordinate, a plurality of first energizing means each comprising an independent winding respectively linking each of said elements of a corresponding one of said plate units, a plurality of second energizing means each comprising an independent winding respectively linking predetermined ones of said elements of said plate units along said first coordinate corresponding to a predetermined location of said second coordinate, the corresponding apertures of said units being in linear alignment along said third coordinate and each of the windings of said second means linearly extend through corresponding apertures of said units to link each of the elements along the first coordinate within the surface defined by respective predetermined locations of said second and third coordinates, only those elements of said device being excited which are concurrently energized by their first and second means, said units each including a conductive plating linking said apertures to provide a respective winding of said first energizing means, said units and their apertures being arranged to conform with a Cartesian coordinate system, said units being positioned in planes along the X axis, said elements being respectively positioned in rows along the Y axis, and in columns along the Z axis, each of said first means being an X access winding linking each of the elements in its unit, each of said second means being a Y access winding linking each of the elements in the Y, Z plane corresponding to the Y location of respective Y access windings, said Y access windings being linearly strung parallel to the X axis through aligned apertures of said units, each of said Y access windings providing adjacent linear conducting paths of its winding with opposite senses parallel to the X axis, and a plurality of sense windings for respective columns of said units linking each of the elements in corresponding X, Y planes, said sense windings being linearly strung parallel to the X axis through aligned apertures of said units and providing a conducting path in the same sense as its associated X and Y access windings along predetermined paths and in the opposite sense along other predetermined paths to reduce the production of noise signals.

2. The memory device of claim 1 in which each of said sense windings has portions of its said linear conducting paths interconnected with other such portions to provide composite aligned colinear conducting paths directed parallel to the X axis and of opposite senses to cancel noise signals produced by said device.

3. The memory device of claim 1 including a plurality of digit windings for respective columns of said units linking each of said elements in corresponding X, Y planes, said digit windings being linearly strung parallel to the X axis thru aligned apertures of said units and providing adjacent linear conducting paths with opposite senses.

4. The memory device of claim 3 in which each of said sense windings has portions of its said linear conducting paths interconnected with other such portions to provide composite aligned colinear conducting paths directed parallel to the X axis and of opposite senses, and each of said digit windings provides adjacent linear conducting paths with opposite senses parallel to the X axis and having a sense opposite to that of its associated X and Y access windings along said paths.

References Cited by the Examiner

UNITED STATES PATENTS

| | | | |
|---|---|---|---|
| 2,700,150 | 1/55 | Wales | 340—174 |
| 2,716,268 | 8/55 | Steigerwalt | 29—155.5 |
| 2,736,880 | 2/56 | Forrester | 340—174 |
| 2,778,005 | 1/57 | Allen | 340—174 |
| 2,784,391 | 3/57 | Rajchman et al. | 340—174 |
| 2,792,563 | 5/57 | Rajchman | 340—174 |
| 2,825,891 | 3/58 | Duinker | 340—174 |
| 2,877,540 | 3/59 | Austen | 29—155.5 |
| 2,878,463 | 3/59 | Austen | 340—174 |
| 2,882,519 | 4/59 | Walentine et al. | 340—174 |
| 2,901,736 | 8/59 | Sylvester | 340—174 |
| 2,902,678 | 9/59 | Kosonocky | 340—174 |
| 2,910,675 | 10/59 | Gessner | 340—174 |
| 2,911,627 | 11/59 | Kilburn et al. | 340—174 |
| 2,942,240 | 6/60 | Rajchman et al. | 340—174 |
| 2,952,840 | 9/60 | Ridler et al. | 340—174 |
| 2,988,732 | 6/61 | Vinal | 340—174 |

FOREIGN PATENTS

| | | |
|---|---|---|
| 769,384 | 3/57 | Great Britain. |

IRVING L. SRAGOW, *Primary Examiner.*

EVERETT R. REYNOLDS, *Examiner.*